United States Patent [19]
Byrd et al.

[11] Patent Number: 6,152,789
[45] Date of Patent: Nov. 28, 2000

[54] BATTERY TERMINAL CONTACTOR

[75] Inventors: Timothy J. Byrd, Goffstown, N.H.; Robert A. Orlando, North Andover, Mass.

[73] Assignee: Schneider Automation Inc., North Andover, Mass.

[21] Appl. No.: 09/036,880

[22] Filed: Mar. 9, 1998

[51] Int. Cl.[7] .................................................. H01R 4/48
[52] U.S. Cl. ............................................. 439/862; 439/747
[58] Field of Search ...................................... 439/500, 862, 439/746, 749, 929, 747; 429/99, 100, 96

[56] References Cited

U.S. PATENT DOCUMENTS

| | | | |
|---|---|---|---|
| 4,357,069 | 11/1982 | Milora | 439/856 |
| 4,371,594 | 2/1983 | Ohara et al. | 429/97 |
| 4,973,257 | 11/1990 | Lhotak | 439/81 |
| 5,421,745 | 6/1995 | Aksoy et al. . | |
| 5,714,716 | 2/1998 | Yamada | 174/52.1 |
| 5,805,423 | 9/1998 | Wever et al. | 361/760 |
| 5,863,674 | 1/1999 | Yamanaka | 429/100 |

FOREIGN PATENT DOCUMENTS

| | | |
|---|---|---|
| 0 749 185 A1 | 6/1996 | European Pat. Off. . |
| 2 280 995 | 2/1995 | United Kingdom . |
| WO 98/19354 | 5/1998 | WIPO . |

OTHER PUBLICATIONS

Catalog pages illustrating various battery contactors (Keystone New Product Bulletin, Mar. 1997) (3 pages).

*Primary Examiner*—Lincoln Donovan
*Assistant Examiner*—Javaid Nasri
*Attorney, Agent, or Firm*—Larry I. Golden; Michael J. Femal

[57] ABSTRACT

A battery terminal contactor for attachment to a battery housing is disclosed. The battery terminal contactor comprises a contactor portion and a base portion flexibly secured to the contactor portion. The base portion includes a fixed portion and a latch portion. The latch portion is resiliently connected to the fixed portion. The latch portion has a beveled hook portion for engaging an abutment on the battery housing as the battery terminal contactor is inserted in the housing, to bias the hook portion around the abutment to permit the hook portion to securely engage the abutment and secure the battery terminal contactor to the battery housing.

16 Claims, 2 Drawing Sheets

BATTERY TERMINAL CONTACTOR

TECHNICAL FIELD

The present invention relates to battery terminal contactor which can be secured to a battery housing without a need for additional fasteners.

BACKGROUND OF THE INVENTION

Various electronic devices include battery housings. Such battery housings typically include battery clips, both to engage the terminals of the batteries therein, as well as to connect to a wire to transfer the electricity from the battery to the electronic components of the device.

SUMMARY OF THE INVENTION

It is an object of the invention to provide a battery terminal assembly.

In accordance with the invention, the battery terminal assembly comprises a housing surface having opposing walls defining a slot and a battery terminal contactor for insertion into the slot. The battery terminal contactor comprises a contactor portion and a base portion flexibly secured to the contactor portion. The base portion includes a fixed portion and a latch portion. The latch portion is resiliently connected to the fixed portion. The latch portion has a beveled hook portion for engaging one of the opposing walls on the housing surface as the battery terminal contactor is inserted in the slot. This biases the hook portion around the wall to permit the hook portion to securely engage the wall and secure the battery terminal contactor to the battery housing.

It is contemplated that the contactor portion is integral with the base portion, and that the base portion is planer.

It is further contemplated that the fixed portion and the latch portion are coplaner.

It is still further contemplated that the hook portion is disposed on the terminal end of the latch portion.

It is still further contemplated that the contactor portion is disposed at an acute angle relative to the base potion, and that the base portion includes means for securing a wire. The securing means is contemplated to be an integral wire loop. The base portion and the contactor portion are contemplated to be tin-plated phosphor-bronze.

DETAILED DESCRIPTION

Figure 1:
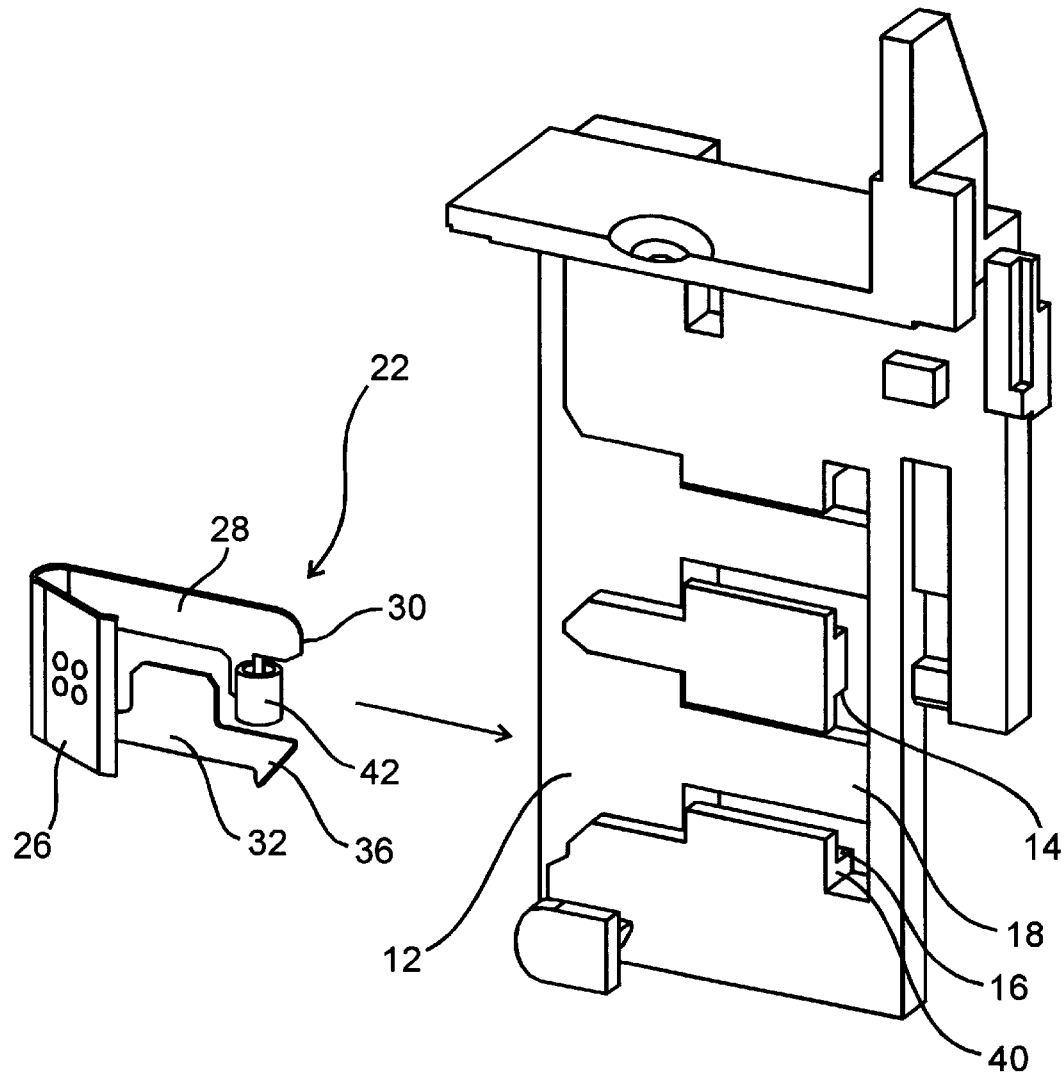
FIG. 1 is a perspective view of a battery clip assembly removed from a wall of a battery housing in accordance with the invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Figure 2:
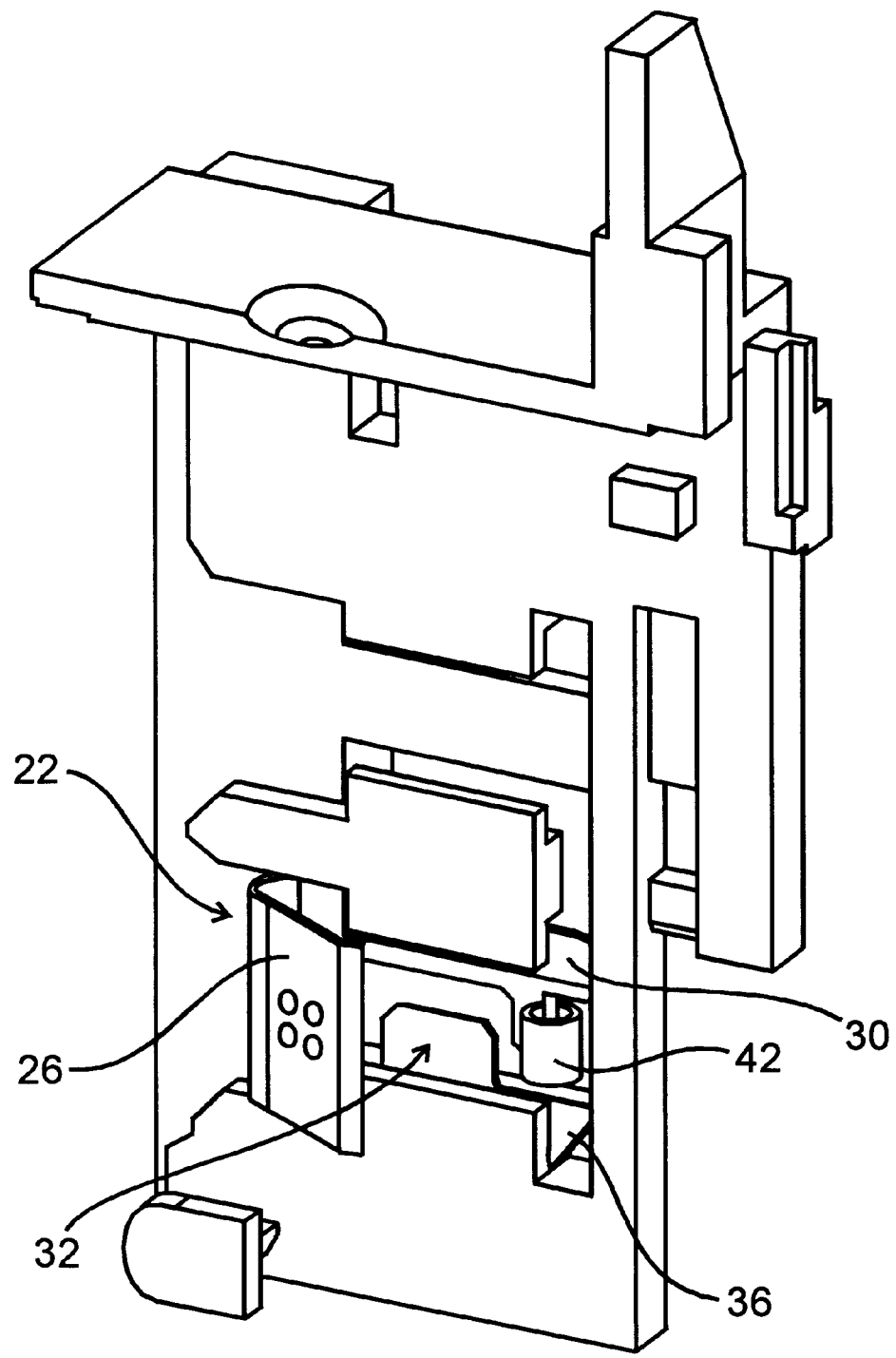
FIG. 2 is a perspective view of the battery clip assembly of FIG. 1, in engagement with the wall of the battery housing.

A battery terminal assembly 10 is illustrated in FIGS. 1 and 2. The assembly 10 includes a housing surface 12 having opposing walls 14, 16 defining a slot 18. The assembly 10 further includes a battery terminal contactor 22 for insertion in the slot 18.

The battery terminal contactor 22 comprises a contactor portion 26 and a base portion 28 flexibly secured to the contactor portion 26. The contactor portion 26 is provided to engage a battery terminal (not shown). The base portion 28 includes a fixed portion 30 and a latch portion 32. The latch portion 32 is resiliently connected to the fixed portion 30. The latch portion 32 has a beveled hook portion 36 for engaging the walls 16 on the housing surface 12 as the battery terminal contactor 22 is inserted in the slot 18, to bias the hook portion 36 along the wall 16 to permit the hook portion 36 to securely engage an abutment 40 of the wall 16 and thereby secure the battery terminal contactor 22 to the housing surface 12.

The contactor portion 26 is integral with the base portion 28. The fixed portion 30 and the latch portion 32 are coplaner, and the hook portion 36 is disposed on the terminal end of the latch portion 32. The contactor portion 26 is disposed at an acute angle relative to the base portion 28. The base portion 28 includes an integral wire loop 42 for a soldered connection to a wire (not shown). The base portion 28 and the contactor portion 26 are tin-plated phospher-bronze.

While the specific embodiment has been illustrated and described, numerous modifications come to mind without significantly departing from the spirit of the invention and the scope of protection is only limited by the scope of the accompanying claims.

We claim:

1. A battery terminal contactor for attachment to a battery housing comprising:
   a metallic contactor portion;
      a metallic base portion flexibly secured to said contactor portion, said base portion including a fixed portion and a latch portion, said latch portion being resiliently connected to said fixed portion, said latch portion having a beveled hook portion for engaging an abutment on said battery housing as said battery terminal contactor is inserted in said housing, to bias said hook portion around said abutment to permit said hook portion to securely engage said abutment and secure said battery terminal contactor to said battery housing; and
      wherein said fixed portion and said latch portion are coplanar; and wherein said
         contactor portion is disposed at an acute angle relative to said base portion.

2. The battery terminal contactor of claim 1 wherein said contactor portion is integral with said base portion.

3. The battery terminal contactor of claim 1 wherein said base portion is planar.

4. The battery terminal contactor of claim 1 wherein said hook portion is disposed on a terminal end of said latch portion.

5. The battery terminal contactor of claim 1 wherein said base portion includes means for securing a wire.

6. The battery terminal contactor of claim 5 wherein said securing means comprises an integral wire loop.

7. The battery terminal contactor of claim 1 wherein said base portion and said contactor portion are tin-plated.

8. The battery terminal contactor of claim 1 wherein said base portion and said contactor portion are tin-plated phosphor-bronze.

9. A battery terminal assembly comprising:
   a housing surface having opposing walls defining a slot;
   a battery terminal contractor for insertion in said slot, said battery terminal contactor comprising a metallic contactor portion; and a metallic base portion flexibly secured to said contactor portion, said base portion including a fixed portion and a latch portion, said latch portion being resiliently connected to said fixed portion, said latch portion having a beveled hook portion for engaging one of said opposing walls on said housing surface as said battery terminal contactor is inserted in said slot, to bias said hook portion around one of said opposing walls to permit said hook portion to securely engage said wall and secure said battery terminal contactor to said battery housing; and wherein said fixed portion and said latch portion are coplanar; and wherein said contactor portion is disposed at an acute angle relative to said base portion.

10. The battery terminal contactor of claim 9 wherein said contactor portion is integral with said base portion.

11. The battery terminal contactor of claim 9 wherein said base portion is planar.

12. The battery terminal contactor of claim 9 wherein said hook portion is disposed on a terminal end of said latch portion.

13. The battery terminal contactor of claim 9 wherein said base portion includes means for securing a wire.

14. The battery terminal contactor of claim 13 wherein said securing means comprises an integral wire loop.

15. The battery terminal contactor of claim 9 wherein said base portion and said contactor portion are tin-plated.

16. The battery terminal contactor of claim 9 wherein said base portion and said contactor portion are tin-plated phospher-bronze.

* * * * *